United States Patent [19]

Raab

[11] 4,126,153

[45] Nov. 21, 1978

[54] COMBINED ELECTRICAL SWITCH AND FLUID POWER CONTROL DEVICE

[75] Inventor: Andrew F. Raab, Morton Grove, Ill.

[73] Assignee: Indak Manufacturing Corp., Northbrook, Ill.

[21] Appl. No.: 761,772

[22] Filed: Jan. 24, 1977

[51] Int. Cl.[2] .......................... H01H 3/04; F16K 33/44

[52] U.S. Cl. .................................. 137/353; 200/61.68; 137/625.2; 200/16 C

[58] Field of Search .............................. 137/353, 625.2; 200/61.68, 16 C; 165/25

[56] References Cited

U.S. PATENT DOCUMENTS

| | | | |
|---|---|---|---|
| 2,966,032 | 12/1960 | Weymouth | 137/637.1 X |
| 3,191,669 | 6/1965 | Johnson | 165/25 |
| 3,721,779 | 3/1973 | Raab | 200/61.86 X |
| 3,845,257 | 10/1974 | Fiddler | 200/61.86 |
| 3,906,178 | 9/1975 | Fiddler | 200/81.86 |
| 3,942,555 | 3/1976 | Raab | 200/61.86 X |

*Primary Examiner*—Alan Cohan
*Attorney, Agent, or Firm*—Burmeister, York, Palmatier, Hamby & Jones

[57] ABSTRACT

The disclosed combined fluid power and electrical control device comprises a casing having an operating lever extending through an opening in the casing between the front and rear sides thereof, means at the rear of the casing pivotally supporting the rear portion of the lever so that it is swingable in the opening, the lever having a front manually operable portion at the front of the casing, and fluid power and electrical control means in the casing and operatively connected to the lever for operation in response to swinging movement thereof. Preferably, the control device includes a carriage movable in the casing, mechanical coupling means between the lever and the carriage for moving the carriage in response to swinging movement of the lever, electrical switching means operable by movement of the carriage, and fluid power control valve means operable by the carriage. The switching means may include fixed electrical contact means mounted on the rear wall of a lamp housing secured within the casing. A contactor is preferably mounted on the carriage for selective engagement with the fixed contact means. The carriage may comprise camming means for moving a slide valve member relative to fluid ports in the casing. Coöperative detent means may be provided on the lever and one side wall of the lamp housing which may be secured in the casing by ratchet latching teeth adapted to interlock with abutment elements. The control device may include a second lever having a cam plate portion with a lateral throw for laterally moving a second slide valve member.

11 Claims, 44 Drawing Figures

FIG. 1
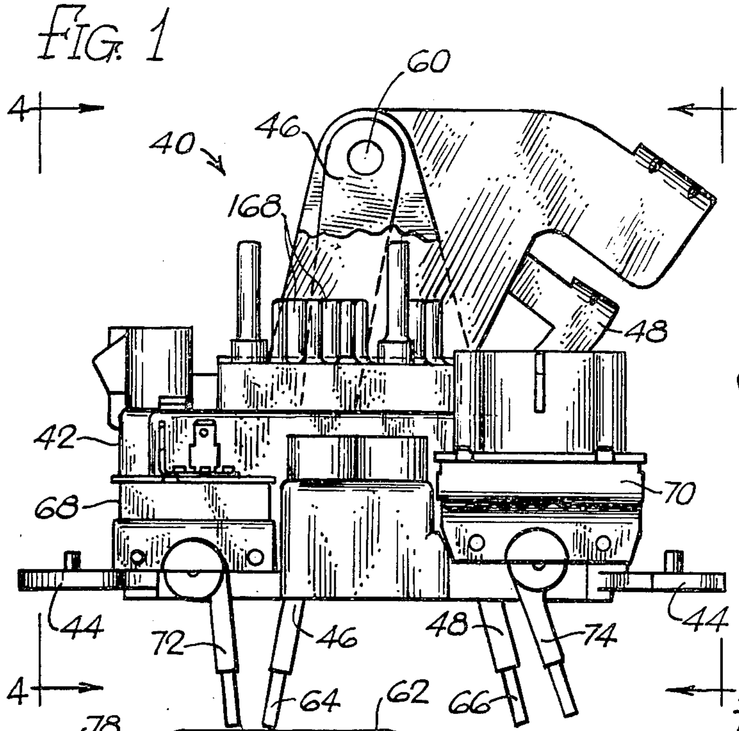
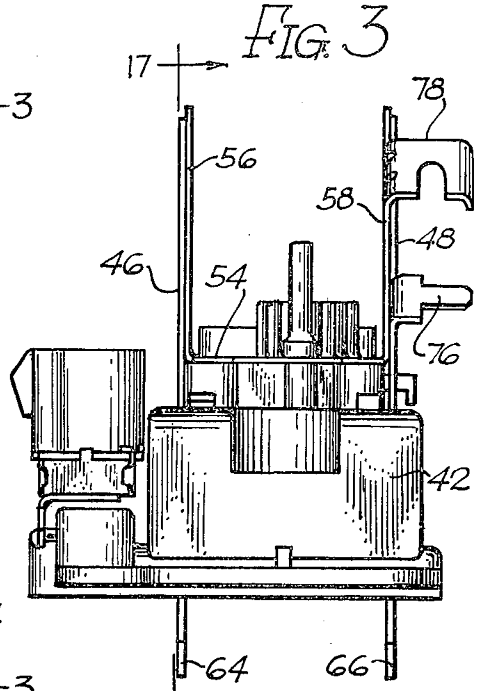
FIG. 3
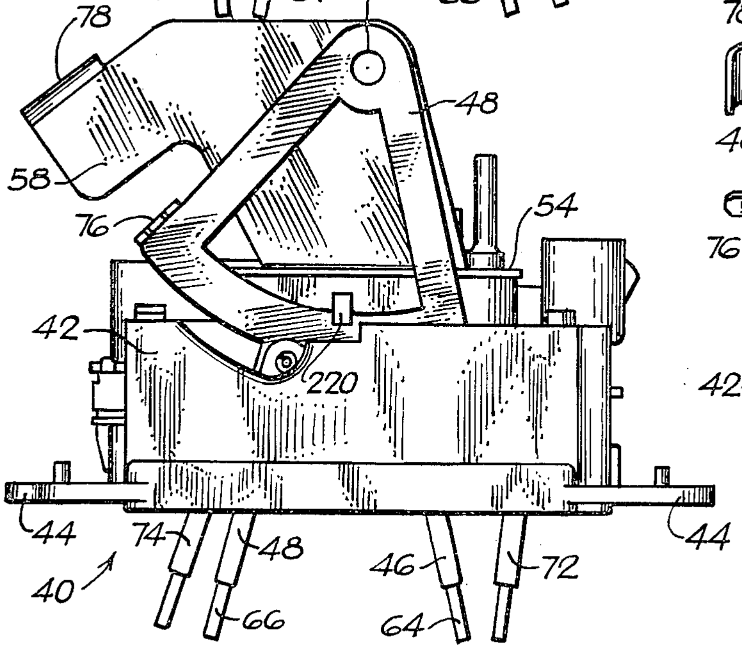
FIG. 2
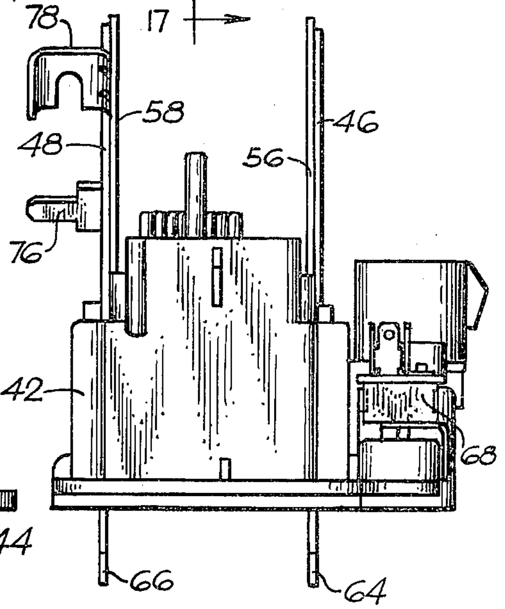
FIG. 4

FIG. 5
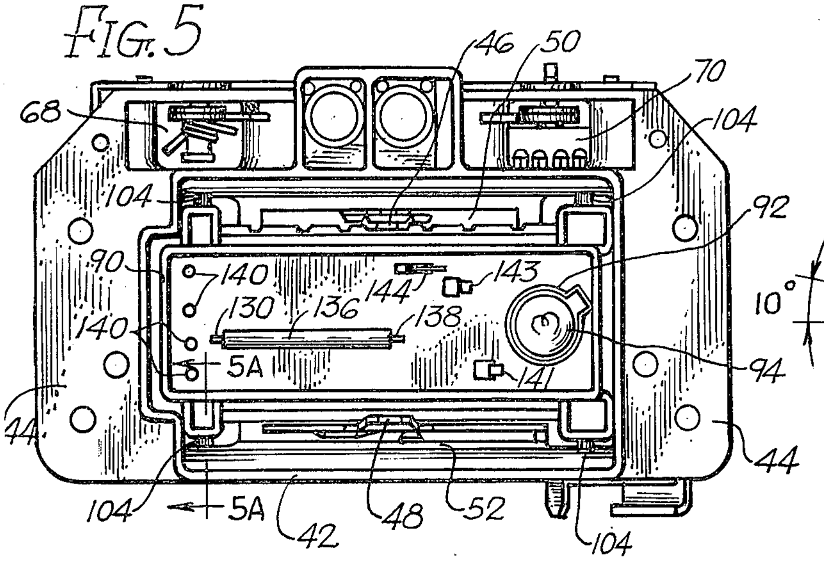
FIG. 5A
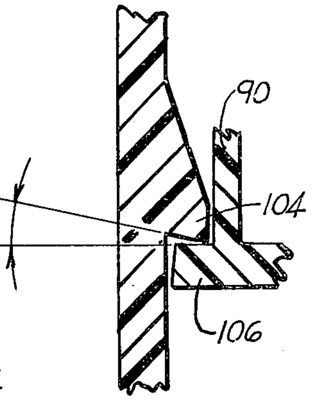
FIG. 6
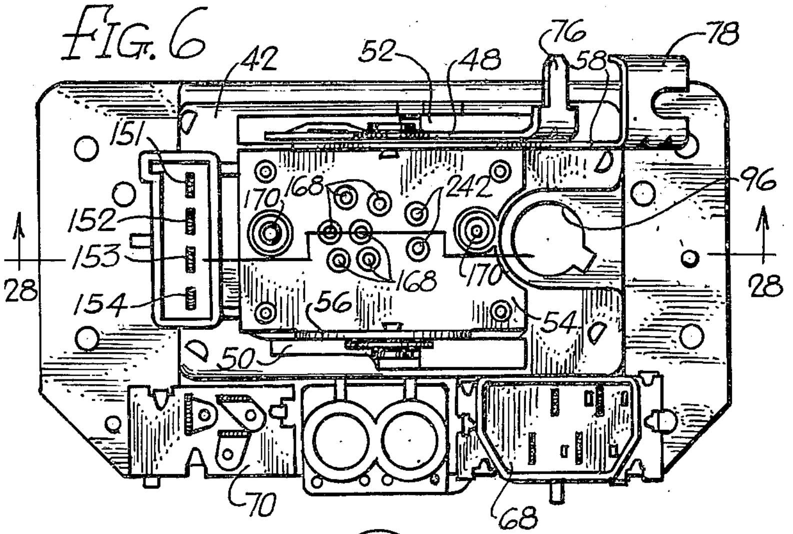
FIG. 7
FIG. 8A
FIG. 8
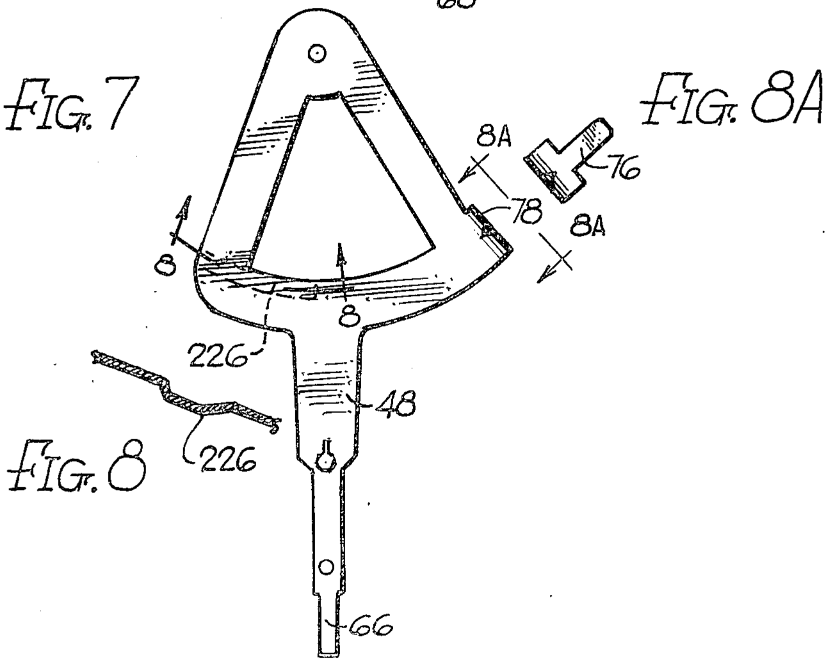

FIG. 12
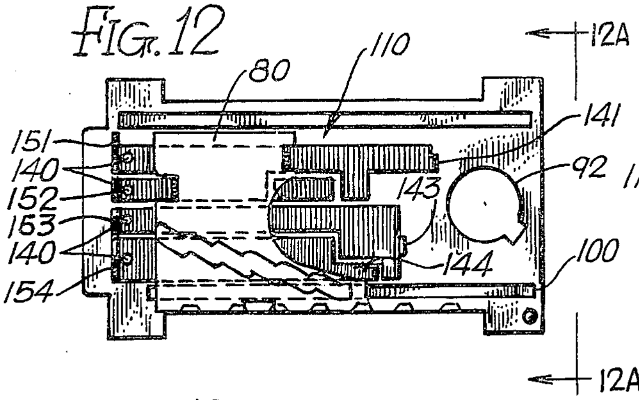
FIG. 14
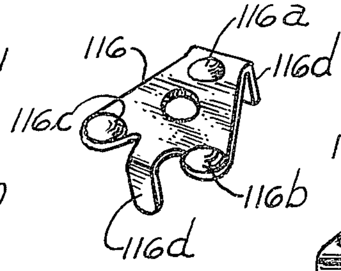
FIG. 15
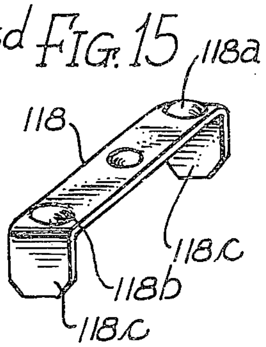
FIG. 13
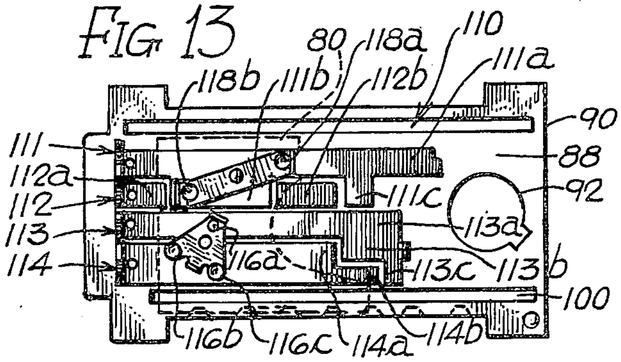
FIG. 16
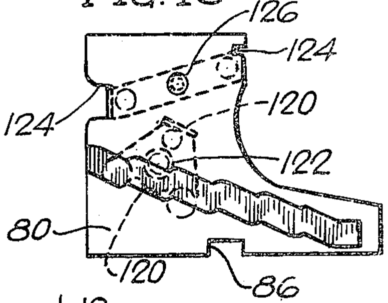
FIG. 17
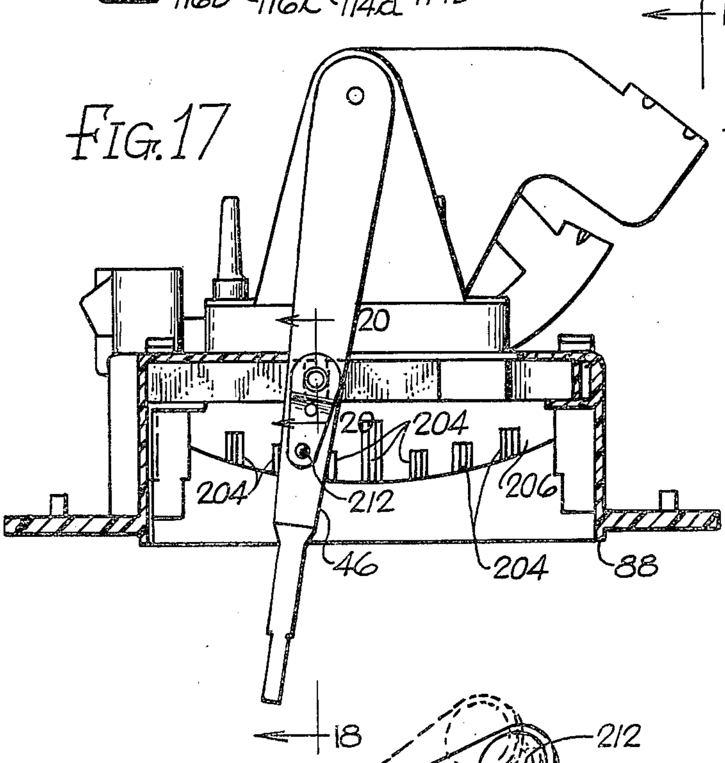
FIG. 18
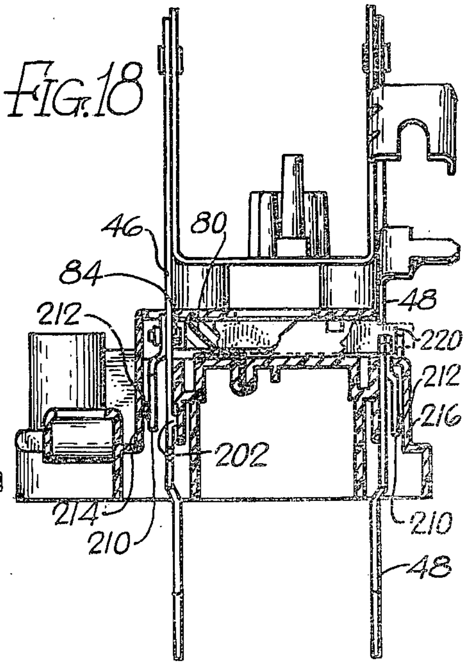
FIG. 19
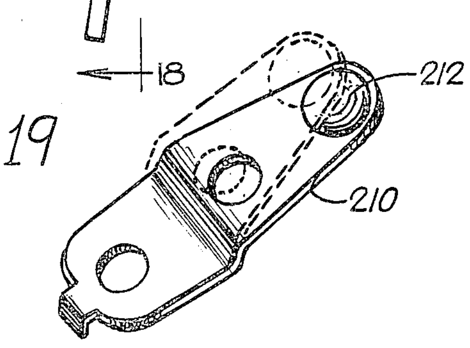
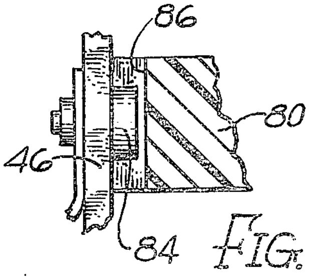
FIG. 20

FIG. 34
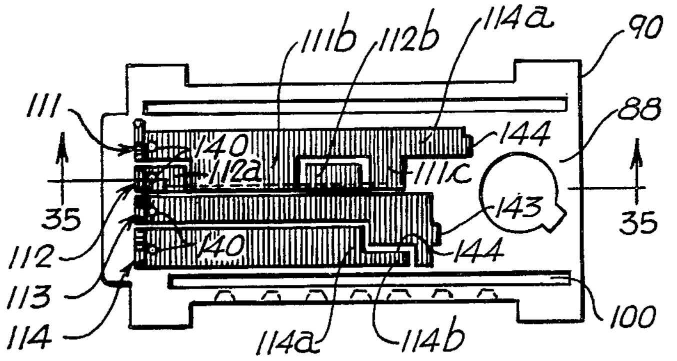
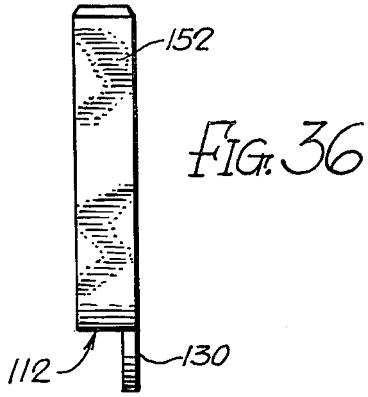
FIG. 36
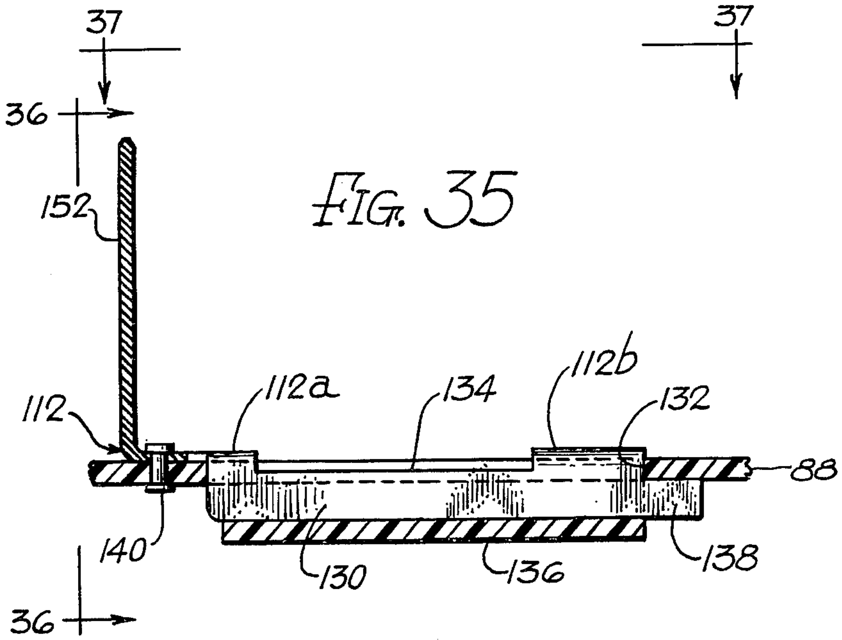
FIG. 35
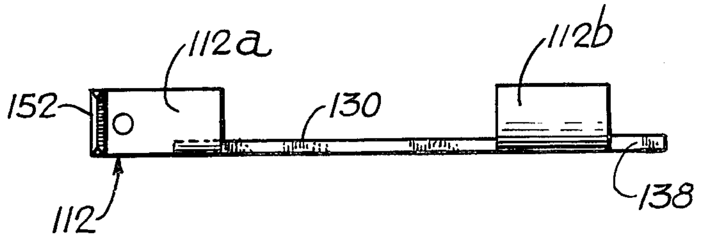
FIG. 37

COMBINED ELECTRICAL SWITCH AND FLUID POWER CONTROL DEVICE

This invention relates to a combined fluid power and electrical control device of the general type disclosed and claimed in the United States Patent to Andrew F. Raab and Jesse M. Cobb U.S. Pat. No. 3,942,555, issued Mar. 9, 1976, and the copending United States Patent Application of Andrew F. Raab and Raymond T. Halstead, Ser. No. 658,615, filed Feb. 17, 1976 now U.S. Pat. No. 4,054,761.

One principal object of the present invention is to provide a new and improved control device which combines fluid power and electrical control means.

A further object is to provide such a new and improved control device which is unitary and self-contained, in that it includes one or more operating levers for controlling the fluid power and electrical control means.

Another object is to provide such a new and improved control device which ingeniously incorporates a housing for a lamp adapted to illuminate a control panel which may be provided at the front of the control device.

In accordance with the present invention, the combined fluid power and electrical control device comprises a casing, an operating lever extending through an opening between the front and rear sides of the casing and movable in such opening, means at the rear of the casing pivotally supporting the rear portion of the lever so that the lever is swingable in the opening, the lever having a front manually operable portion at the front of the casing, and fluid power and electrical control means in the casing and operatively connected to the lever for operation in response to swinging movement of the lever.

A carriage is preferably movable in the casing and is connected to the lever by mechanical coupling means, so that the carriage is movable in response to swinging movement of the lever. The carriage may operate electrical switching means and fluid power control valve means in the casing. The fluid power control means may include a slide valve which is movable by camming means on the carriage, so as to control communication between ports on the casing.

The carriage is preferably provided with one or more movable contactors which are selectively engageable with fixed contact means on the rear wall of a lamp housing mounted within the casing. Ratchet locking elements are preferably provided to secure the lamp housing within the casing.

Detent recesses are preferably provided in one side wall of the lamp housing, for receiving a dentent porojection on the lever. A spring pressure element is preferably provided between the lever and adjacent wall of the casing.

The control device preferably includes a second lever having a cam plate portion with a lateral throw for laterally moving a control member, preferably taking the form of a second slide valve member in the casing. The slide valve member preferably comprises a pair of spaced cam followers for engaging the opposite sides of the cam plate portion. One or both of the levers may comprise means for operating a mechanical linkage, such as a control cable.

Further objects, advantages and features of the present invention will appear from the following description, taken with the accompanying drawings, in which:

FIG. 1 is a top plan view of a combined fluid power and electrical control device, to be described as an illustrative embodiment of the present invention.

FIG. 2 is a bottom view of the control device.

FIG. 3 is an end view, taken as indicated by the line 3—3 in FIG. 1.

FIG. 4 is an opposite end view, taken as indicated by the line 4—4 in FIG. 1.

FIG. 5 is a front view of the control device of FIG. 1.

FIG. 5A is a fragmentary enlarged section, taken generally along the line 5A—5A in FIG. 5.

FIG. 6 is a rear view of the control device.

FIG. 7 is a plan view of one of the control levers for the control device.

FIG. 8 is a fragmentary section, taken generally along the line 8—8 in FIG. 7.

FIG. 8A is a fragmentary elevation, taken generally as indicated by the line 8A—8A in FIG. 7.

FIG. 12 is a rear view of the lamp housing with the carriage in place.

FIG. 13 is a view similar to FIG. 12, but with the carriage shown in phantom to reveal the contactors carried by the carriage.

FIGS. 14 and 15 are perspective views showing the conactors.

FIG. 16 is a rear view of the carriage for the control device.

FIG. 17 is a sectional view, taken generally along the line 17—17 in FIG. 3.

FIG. 18 is a sectional view taken generally along the broken line 18—18 in FIG. 17.

FIG. 19 is a perspective view of a pressure spring employed on the control levers for the control device.

FIG. 20 is a fragmentary enlarged section, taken generally along the line 20—20 in FIG. 17.

FIG. 34 is a rear view of the lamp housing with the carriage and the contactors removed.

FIG. 35 is a section, taken generally along the line 35—35 in FIG. 34.

FIG. 36 is an end view of one of the fixed contact members, taken as indicated by the line 36—36 in FIG. 35.

FIG. 37 is another view of the contact member, taken generally along the line 37—37 in FIG. 35.

Figure 9:
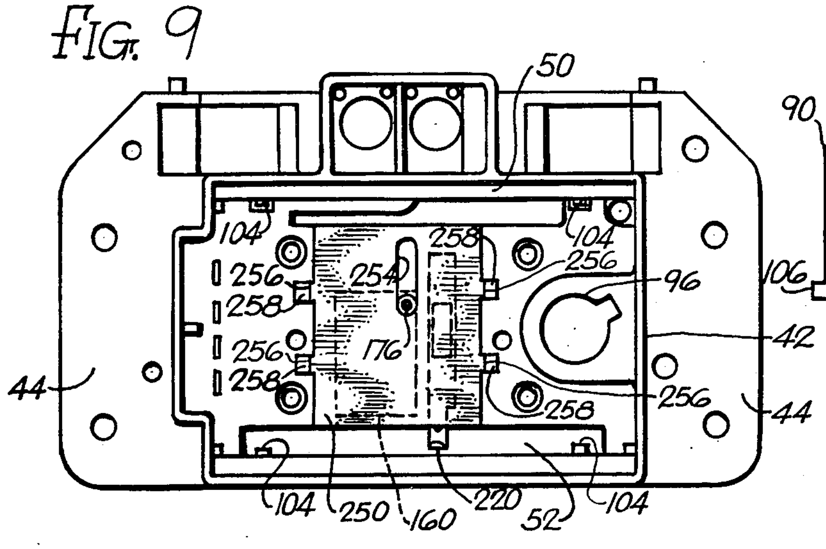
FIG. 9 is a front view with the control levers, the lamp housing and the carriage removed, to expose the cover plate for the slide valves.
Figure 12A:
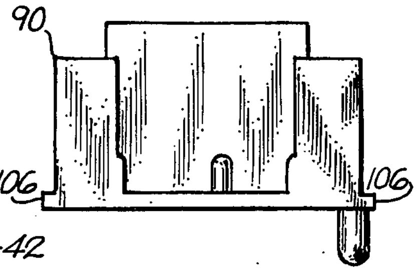
FIG. 12A is an end view of a lamp housing, taken generally as indicated by the line 12A—12A in FIG. 12.
Figure 10:
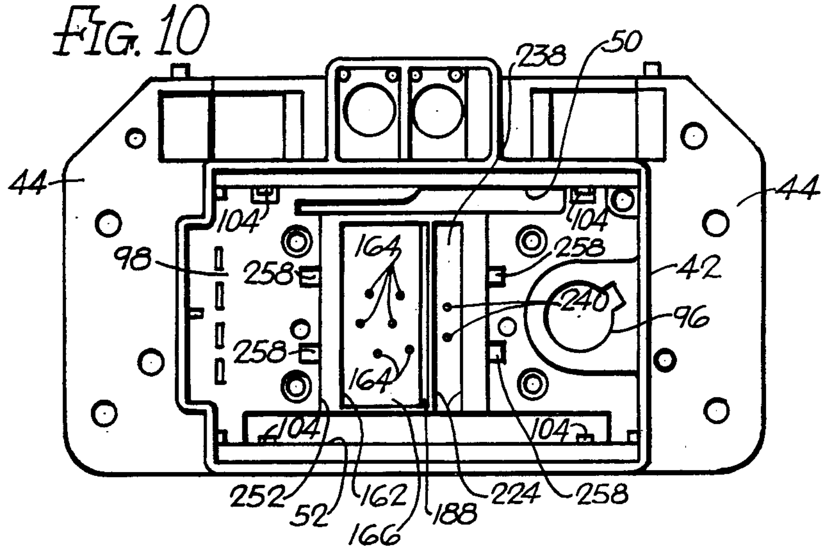
FIG. 10 is a front view similar to FIG. 9, with the cover plate and the slide valves removed.

As just indicated, the drawings illustrate a combined fluid power and electrical control device 40 of a type commonly known as a vacuum-electric switch, adapted to control the heating, air-conditioning and ventilating system of an automobile or some other vehicle. In such a system, certain control components are usually electrically operated and controlled. Such components may include, for example, one or more fan motors and the electrically operated clutch for the air-conditioning compressor. Other components are usually controlled and operated by fluid pressure, such as the vacuum or pressure differential derived from the intake manifold of the internal combustion engine for the vehicle. Such vacuum operated components include movable damper plates or doors in the air ducts of the system. Still other components of the system may be operated by mechanical linkages, such as control cables or wires which are movable in flexible sheaths. The control device 40 is adapted to centralize and coordinate the operation of such fluid power, electrical and mechanical control means.

The illustrated control device 40 comprises a casing 42, which may be made of a resinous plastic material, or any other suitable material. As shown, the casing 42 has a pair of mounting flanges 44 for mounting the casing behind the instrument panel of a vehicle.

The illustrated control device 40 is provided with two swingable operating levers 46 and 48 which are movable along slots or openings 50 and 52 extending between the front and rear sides of the casing 42.

Means are provided for pivotally mounting the rear portions of the levers 46 and 48 on the rear portion of the casing 42. As shown, the rear portion of the casing 42 is fitted with a bracket 54 having a pair of arms or flanges 56 and 58 projecting rearwardly from the casing 42. Pivots 60 and 62 are provided to connect the rear portions of the levers 46 and 48 to the respective bracket arms 56 and 58. The brackets 54 may be made of metal or other suitable material and may be riveted or otherwise secured to the rear side of the casing 42. The levers 46 and 48 extend entirely through the slots 50 and 52 and are provided with front portions 64 and 66 which are manually operable. If desired, knobs or handles, not shown, may be mounted on the front ends 64 and 66 of the levers 46 and 48.

The illustrated casing 42 of the control device 40 also supports two electrical switches 68 and 70 having their own independent operating levers 72 and 74. The switches 68 and 70 may be employed for various purposes, such as to control the actuation and speed of fan motors, or to control the energization of a rear window defogger.

Either or both of the main control levers 46 and 48 may be adapted to be connected to a mechanical linkage, such as a control cable or wire. In this case, the lever 48 has a laterally projecting member 76 which may be connected to the movable operating wire of a control cable. The adjacent bracket arm 58 has a laterally projecting flange 78 upon which the sheath of the control cable may be mounted. It will be understood that the control cable may be connected to a heat control valve, a damper door or the like.

In the illustrated control device 40, the lever 46 is adapted to operate both fluid power control means and electrical control means, disposed within the casing 42. The lever 48 is adapted to operate additional fluid power control means. However, it will be understood that either or both levers may be employed to operate either or both fluid power control means and electrical control means.

Figure 28:
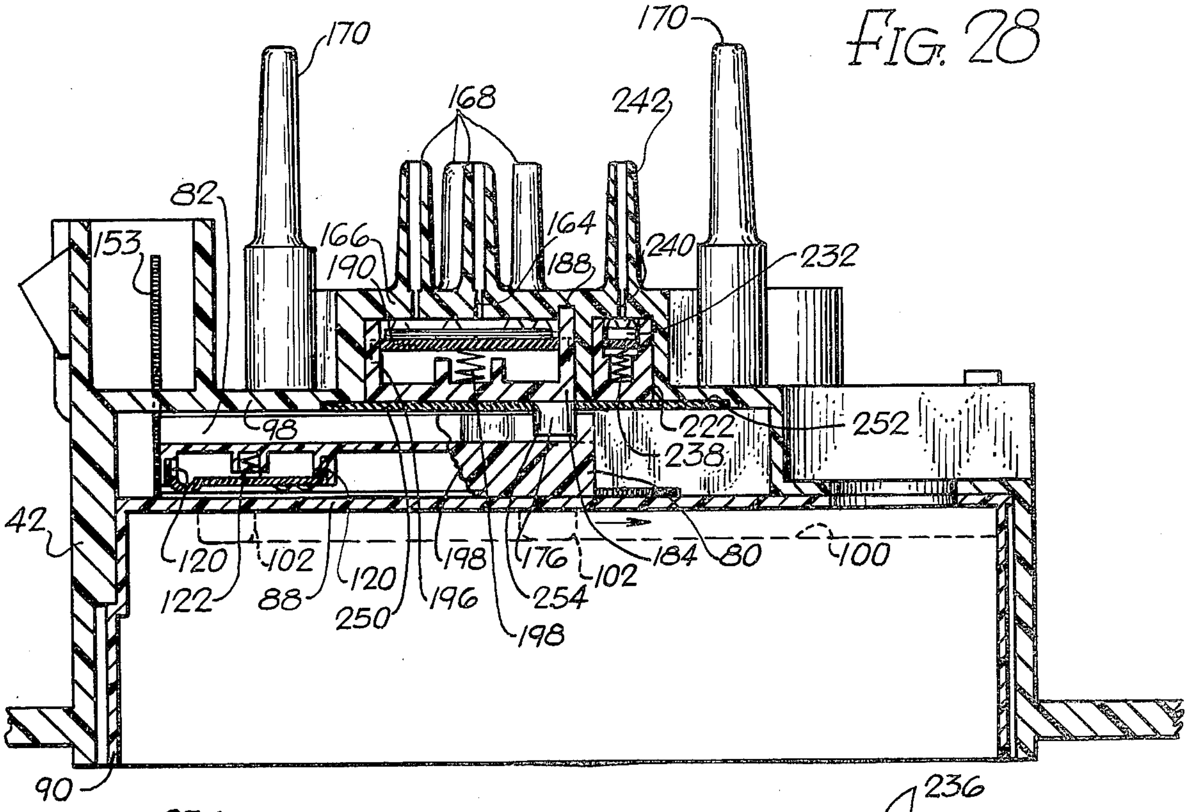
FIG. 28 is an enlarged section, taken generally along the line 28—28 in FIG. 6.
Figure 33A:
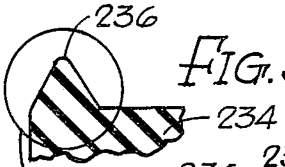
FIG. 33A is a fragmentary enlarged section corresponding to a portion of FIG. 33.
Figure 31:
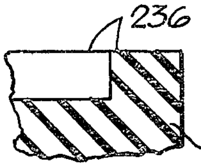
FIG. 31 is a fragmentary enlarged section, taken generally along the line 31—31 in FIG. 29.
Figure 33:
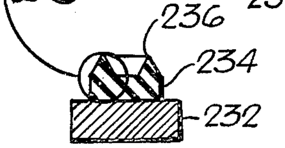
FIG. 33 is a section, taken along the line 33—33 in FIG. 29.

The lever 46 is adapted to operate a first or main carriage 80 which is movable along a predetermined path in the casing 42. The operating connection between the lever 46 and the carriage 80 is shown in FIGS. 18 and 20, while the carriage 80 itself is shown in FIGS. 12, 13, 16 and 21. A longitudinal section through the carriage 80 is shown in FIG. 28.

It will be seen that the carriage 80 is movable longitudinally within a slideway or space 82 in the rear portion of the casing 42. An operative connection or coupling is provided between the lever 46 and the carriage 80. As shown in FIGS. 18 and 20, such coupling is in the form of a pin and slot connection, comprising in this instance a pin 84 on the lever 46 and a slot or groove 86 in one side of the carriage 80.

In this instance, the carriage 80 is guided and supported on the rear wall 88 of a lamp housing 90, mounted within the front portion of the casing 42. The lamp housing 90 may be made of a resinous plastic material, or any othe suitable material. Preferably, the lamp housing 90 is made of a plastic material which is highly resistant to heat and is white in color. An example of a suitable material is nylon filled with calcium carbonate. As shown in FIG. 5, the lamp housing 90 is formed with an opening 92 for receiving a lamp 94 which may be employed for rear illumination of the instrument panel of the automobile. The opening 92 in the lamp housing 90 is aligned with a similar opening 96 in the casing 42.

The carriage 80 is slideable between the rear wall 88 on the lamp housing 90 and the rear wall 98 on the casing 42.

Figure 21:
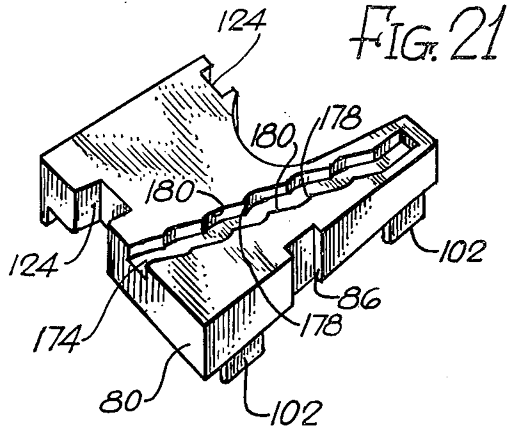
FIG. 21 is a perspective view of the carriage for the control device.
Figure 23:
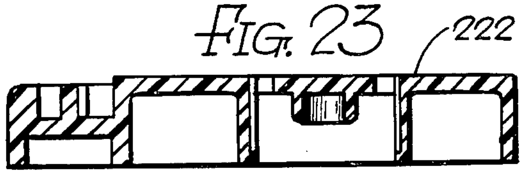
FIG. 23 is a section taken generally along the line 23—23 in FIG. 22.
Figure 22:
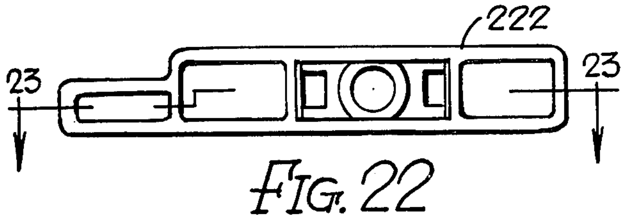
FIG. 22 is a rear view of one of the slide valve carriages.
Figure 25A:
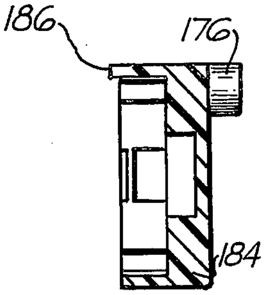
FIG. 25A is a section, taken generally along the line 25A—25A in FIG. 25.
Figure 26:
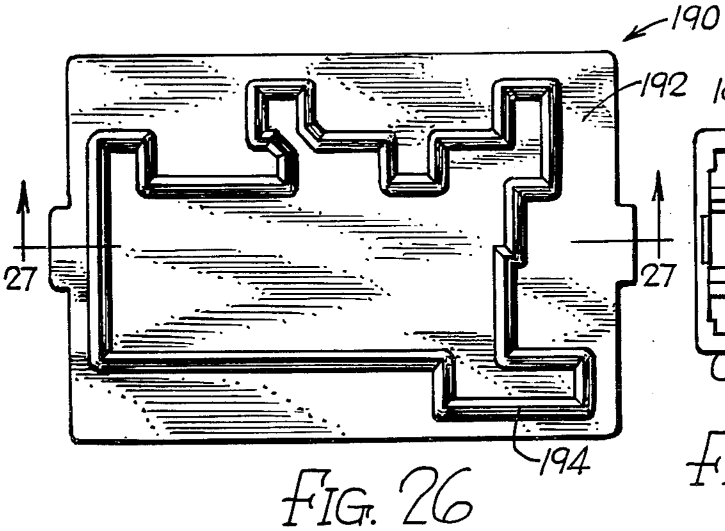
FIG. 26 is an enlarged rear view of the valve plate for the slide valve carriage of FIG. 25.
Figure 25:
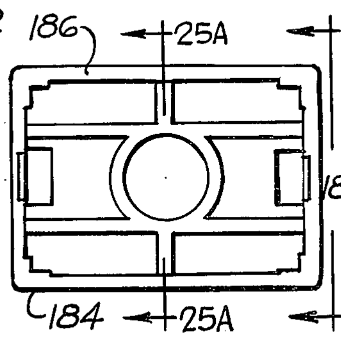
FIG. 25 is a rear view of the other slide valve carriage.
Figure 25B:
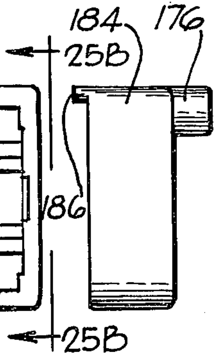
FIG. 25B is an end view taken generally as indicated by the line 25B—25B in FIG. 25.
Figure 27:
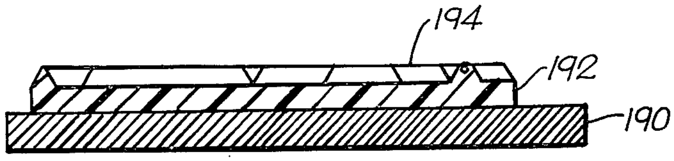
FIG. 27 is a section taken generally along the line 27—27 in FIG. 26.

As illustrated, the carriage 80 and the rear wall 88 of the lamp housing 90 have cooperating guide elements, which are illustrated as comprising a longitudinal groove 100 in the rear wall 88 and longitudinal flange means 102 of the carriage, such flange means being shown in FIG. 21 as comprising a pair of longitudinally spaced flanges. It will be seen that the flanges 102 are adapted to slide smoothly along the longitudinal groove 100, so as to guide the carriage 80 along a linear path.

The illustrated lamp housing 80 is closely received within the casing 42 and is preferably retained and locked within the casing by means of ratchet latching elements. As shown most clearly in FIG. 5A, such ratchet latching elements may take the form of ratchet teeth 104 on the inner sides of sidewall portions of the casing 42. Such ratchet teeth 104 are adapted to interlock with abutments or flanges 106 on the lamp housing 83. There may be four of the ratchet teeth 104 on the casing 42, for example, adapted to engage four flanges 106 on the lamp housing 80.

The ratchet teeth fasteners 104 make it possible to install the lamp housing 80 by simply pressing it rearwardly into the casing 42 until the flanges 106 are forced past the ratchet teeth 104. The casing 42 has sufficient resilience to permit outward deflection of the sidewall portions of the casing so that the flanges 106 can be forced past the latching teeth 104.

The carriage 80 is adapted to operate switching means 110 within the casing 42, as shown in FIGS. 12–15, 28, 34–37. In this instance, such switching means comprise fixed contacts on the rear wall 88 of the lamp housing 90, and movable contacts operable by the carriage 80. As here disclosed, the fixed contacts comprise four conductive contact bars 11, 112, 113 and 114, mounted on the rear wall 88 of the lamp housing 90. The contact bars 11–114 are selectively engageable by two conductive bridging contactors 116 and 118, mounted on and movable with the carriage 80. It will be seen that the contactor 116 is in the form of a conductive plate, made of copper or some other highly conductive material, and formed with three contact points 116*a*, *b* and *c* for engaging the contact bars 111–114. The contactor 116 is also formed with a pair of rearwardly bent locating tabs 116*d* which are slideably received in slots 120 formed in the carriage 80. The contactor 116 is pressed forwardly against the fixed contact bars 111–114 by a coil spring 122, compressed between the contactor and the carriage 80.

Similarly, the other contactor 118 is disclosed as comprising a plate or bar, formed with two forwardly projecting contact points 118*a* and *b*, and two rearwardly bent locating tabs 118*c* which are slideably received in slots or grooves 24, formed in the contactor 80. A spring 126 is compressed between the carriage 80 and the contactor 118 to press the contactor 118 forwardly into engagement with the fixed contact bars 111–114.

The carriage 80 is movable longitudinally, as established by the direction of the guiding groove 100. However, the contactors 116 and 118 are angled or canted relative to the direction of longitudinal movement, as will be evident from FIG. 13, so that the five contact points 116*a*, 116*b*, 116*c*, 118*a* and 118*b* travel along five separate paths which are parallel to the guiding groove 100.

As shown most clearly in FIGS. 13 and 34, the contact bar or plate 111 has a portion or segment 111*a* which extends along the entire path of the contact point 118*a* and is engaged by such contact point throughout its range of movement. In addition, the contact bar 111 has two segments or tabs 111*b* and 111*c* which extend along portions of the path of movement of the contact point 118*b*.

The second contact bar 112 has two longitudinally spaced portions and segments 112*a* and 112*b* which extend along portions of the path of movement of the contact point 118*b*. As shown, the contact segment 111*b* is disposed between the segments 112*a* and 112*b*. It will be seen that the segment 112*b* is disposed between the segments 111*b* and 111*c*.

The third contact bar 113 has a portion or segment 113*a* which extends along the entire path of movement of the contact point 116*a*. In addition, the contact bar 113 has a segment or portion 113*b* which extends along a portion of the path of the contact point 116*b*, and another segment 113*c* which extends along a portion of the path of movement of the contact point 116*c*.

As shown, the contact bar 114 has a portion or segment 114*a* which extends along a portion of the path of the contact point 116*b*, and another portion or segment 114*b* which extends along a portion of the path of movement of the contact point 116*c*. The segments 114*a* and 114*b* are constructed and arranged so that the transition of the contact point 116*b* from the segment 114*a* to the segment 114*b* is simultaneous with the transition of the contact point 116*c* from the segment 114*b* to the segment 113*c*. This construction provides a double break switching action, which greatly prolongs the life of the contact elements, comprising the contact points 116*b* and *c* and the contact segments 114*a* and *b*. The arcing or sparking which is caused by the breaking of the electrical circuit between the contact bars 113 and 114 tends to occur alternately at the contact segments 114*a* and *b*, so that the erosion due to such arcing is distributed equally between the segments 114*a* and *b*.

If, in any particular instance, the circuit is broken at the segment 114*a*, the resulting erosion tends to cause the circuit to be broken in the next instance at the segment 114*b*. The resulting erosion tends to cause the circuit to be broken in the next instance at the contact segment 114*a*. This alternating break cycle tends to be repeated indefinitely. The provision of the three-point contactor 116 makes it possible to achieve this alternating break action.

The contactor 118 opens and closes a separate circuit between the contact bars 111 and 112. The circuit is closed when the contact point 118*b* engages the contact segments 112*a* and *b*. Such circuit is open when the contact point 118*b* engages the segments 111*b* and 111*c*.

It will be recalled that the contact segments 112*a* and *b* are spaced apart, and that the contact segment 111*b* is interposed between the segments 111*a* and *b*. As shown in FIGS. 34–37, the contact bar 112 is constructed in an advantageous manner to connect the segments 112*a* and *b* together electrically, while also supporting them mechanically. As shown in FIG. 35, the contact segments 112*a* and 112*b* are mounted flat against the rear wall 88 of the lamp housing 90. The segments 112*a* and *b* are connected together, both electrically and mechanically, by a flange 130 which is bent perpendicular to the segments 112*a* and *b* and is recessed into a slot 132 formed in the supporting wall 88. The inner portion of the bridging flange 130 is formed with a cutout 134 which extends between the contact segments 112*a* and *b*, so that the flange 130 is fully recessed into the slot 132. Thus, the bridging flange 130 cannot come into contact with the adjacent contact member 111*b*. The supporting wall 88 is preferably formed with a forwardly projecting channel-shaped portion 136 which provides electrical insulation around the bridging flange 130.

It will be recalled that the contact segments 112*a* and *b* engage the rear side of the supporting wall 88. As shown in FIG. 35, the bridging flange 130 is formed with a finger or prong 138 which engages the front side of the wall 88, to retain the flange 130 in the slot 132.

In addition, the contact bar 112 and also the contact bars 111, 113 and 114 are secured to the supporting wall 88 by rivets 140 or other fasteners. The contact bars 111, 113 and 114 may be formed with locating tabs or flanges 141, 143 and 144 which extend forwardly through corresponding slots in the wall 88, to assist in holding the contact bars 111, 113 and 114 against the wall 88.

The illustrated contact bars 111, 112, 113 and 114 are provided with terminals or prongs 151, 152, 153 and 154 which are bent rearwardly, perpendicular to the bars, and are adapted to extend out of the casing 42 through corresponding slots in the rear wall 98 thereof, as shown in FIGS. 6 and 28. The terminals 151–154 are adapted to receive a suitable electrical connector, whereby the terminals are connected to the electrical system to be controlled by the control device 40.

The movable carriage 80 is also adapted to operate fluid power control means, here disclosed as comprising a slide valve 160, as shown in FIGS. 9–11 and FIGS. 25–28. The illustrated slide valve 160 is slideable transversely, relative to the longitudinal movement of the carriage 80, in a slideway 162 formed in the casing 42, to the rear of the carriage 80. The slide valve 160 is adapted to control the fluid communication between two or more ports 164, extending through a rear wall 166 of the slideway 162. In this case there are six of the ports 164, arranged in a suitable pattern to achieve the desired valving action. Corresponding nipples 168 project rearwardly on the casing 42 from the ports 164, to receive a suitable fluid handling connector, whereby the valve device may be connected to the vacuum control components of the heating, ventilating and air-conditioning system. Such connector also mates with guide posts 170, projecting rearwardly from the casing 42.

The longitudinally movable carriage 80 is operatively connected to the transversely movable slide valve 160, preferably by camming means, here shown as comprising a cam track or groove 174, formed in the carriage 80, and a cam follower, which may take the form of a pin 176 projecting forwardly from the slide valve 160. The cam groove 174 has a lateral throw and is preferably formed on both sides with alternating serrations 178 and recesses 180, which are staggered, so that the serrations 178 on one side of the cam groove 174 are opposite the recesses 180 on the opposite side, as clearly shown in FIGS. 16 and 21. This construction is in accordance with the invention disclosed and claimed in the United States Patent to Andrew F. Raab and Jesse M. Cobb, U.S. Pat. No. 3,942,555, issued Mar. 9, 1976. As explained in such patent, this construction has the advantage of compensating for any slight play between the cam groove 174 and the cam follower 176, so that the slide valve 160 will be positioned with a high degree of precision for both directions of movement of the carriage 80.

The slide valve 160 comprises a slide valve carriage 184 which is slideable in the slideway 162. The illustrated slide valve carriage 184 is formed with a guide flange 186 which is slideably received in a guiding groove 188, formed in the rear wall 166 along one side of the slideway 162. The close sliding engagement between the guide flange 186 and the groove 188 maintains the slide valve carriage 184 along its predetermined path of movement with a high degree of precision.

As illustrated, a slide valve plate 190 is mounted on and movable with the slide valve carriage 184. The valve plate 190 carries a soft resilient sealing member 192 having a rearwardly projecting ridge 194 which is slideable along the rear wall 166 in which the ports 164 are formed. The ridge 194 has a complex, irregular outline, adapted to carry out the desired valving functions in relation to the ports 164. The valve sealing member 192 may be made of a suitable soft resilient material, such as silicone rubber.

It will be seen from FIG. 28 that the valve plate 190 is mounted within a cavity or recess 196 in the valve carriage 184 and is pressed rearwardly by a biasing spring 198, here illustrated as a coil spring, compressed between the carriage 184 and the plate 190.

It will be understood that the swinging movement of the control lever 46 produces longitudinal sliding movement of the main carriage 80, which, in turn, produces coordinate movement of the electrical contactors 116 and 118 and the transversely slideable valve member 160. Thus, the electrical and fluid power control functions are carried out in a coordinated manner.

Detent means are preferably provided to detain the main control lever 46 in a plurality of positions. Such detent means are shown to best advantage in FIGS. 5, 17, 18 and 19. In this case, the lever 46 is formed with a detent projection 202 which is adapted to be received in a series of detent grooves or recesses 204, formed in a side wall member 206 of the lamp housing 88.

A spring pressure device is also preferably provided between the lever 46 and the casing 42. As shown, the spring pressure device is in the form of a flexible resilient leaf spring 210, mounted on the lever 46 and having a rounded boss or projection 212 which slides along a side wall 214 of the casing 42. The pressure spring 210 presses the detent projection 202 on the lever 46 into the detent recesses 204. The detent projection 202 is pressed against the wall 206 when the detent projection is in transit between the detent recesses 204.

The second operating lever 48 also preferably carries a pressure spring 210, the same as shown in FIG. 19, which presses against a side wall member 216 of the casing 42, so as to provide a small amount of frictional resistance to the movement of the lever 48, so that it will stay in any position to which it may be adjusted.

Figure 24A:
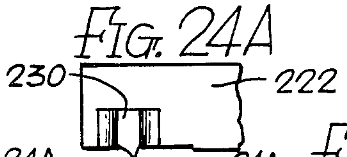
FIG. 24A is a fragmentary view, taken generally as indicated by the line 24A—24A in FIG. 24.
Figure 24:
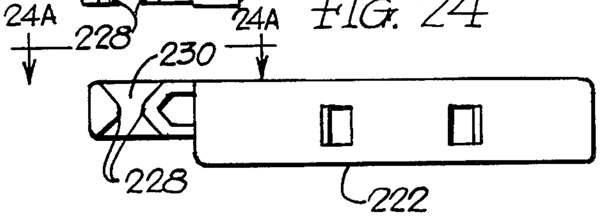
FIG. 24 is a front view of the slide valve carriage of FIG. 22.

In the illustrated control device 40, the second control lever 48 operates an additional fluid control valve 220, as shown in FIGS. 6–11A, 18, 22–24A, 28 and 29–33A. The illustrated valve 220 comprises a slide valve carriage 222 which is slideable in a transverse slideway 224, formed in the rear portion of the carriage 42, next to the slideway 162. Operative coupling means are provided between the lever 48 and the slide valve carriage 222, to produce lateral movement of the slide valve carriage in response to swinging movement of the lever 48. As shown, such coupling is provided by camming means in the form of a cam plate portion 226 on the lever 48. It will be evident from FIG. 8 that the cam plate 226 has a lateral throw. The illustrated slide valve carriage 222 incorporates follower means for following the cam plate 226. Such follower means may comprise a pair of spaced follower elements 228 with a slot 230 therebetween to receive the cam plate 226. A close sliding fit may be provided between the cam plate 226 and the follower elements 228, so that the slide valve carriage 222 will be moved with a high degree of precision for both directions of movement of the lever 48. As shown in FIG. 24, the follower elements 228 are tapered and smoothly rounded to provide for easy sliding movement of the cam plate 226 between the follower elements.

Figure 11A:
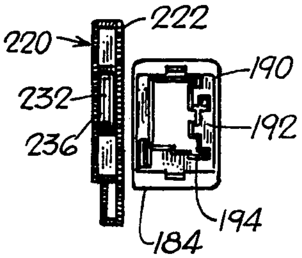
FIG. 11A is a rear view of the slide valves.
Figure 11:
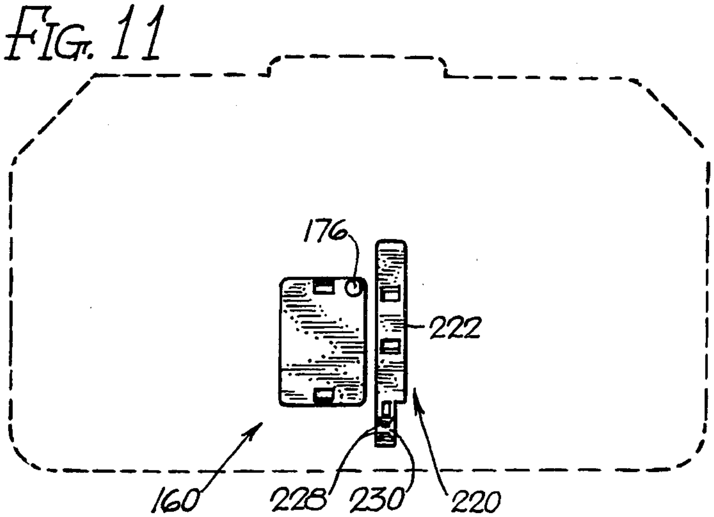
FIG. 11 is a front view showing the slide valves.
Figure 29:
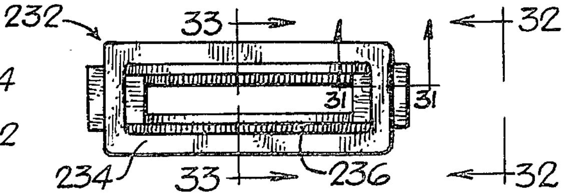
FIG. 29 is an enlarged rear view of the valve plate for the slide valve carriage of FIG. 22.
Figure 32:
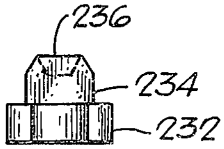
FIG. 32 is an end view, taken as indicated by the line 32—32 in FIG. 29.
Figure 30:
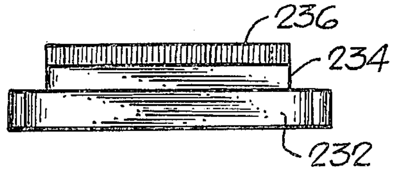
FIG. 30 is an edge view of the valve plate of FIG. 29.

The valve carriage 222 preferably supports a valve plate 232 which carries a soft resilient sealing member 234. As shown in FIGS. 11A and 29, the sealing member 234 has rearwardly projecting ridges 236 which are slideable along a flat rear wall 238 on the casing 42. Two or more fluid valve ports 240 extend through the rear wall 238. In this case there are two of the ports 240. Corresponding nipples 242 project rearwardly from the casing 42 around the ports 240 to receive elements of the fluid carrying connector, which also mates with the nipples 168, as previously described.

As shown in FIG. 28, the valve plate 232 may be pressed rearwardly by a biasing spring 244, which may be in the form of a coil spring, compressed between the valve plate 232 and the valve carriage 222. The sealing member 234 is made of a suitable soft resilient material, such as silicone rubber.

It will be seen from FIGS. 2, 3, 9 and 18 that the slide valve 220 projects outside the casing 42 from the slideway 224, for engagement with the cam plate 226 on the lever 48. When the lever 48 is swung longitudinally, the slide valve 220 is moved laterally, so as to control the communication between the ports 240. The fluid supplied through the ports 240 is employed to actuate a vacuum operated control device for the heating, air-conditioning and ventilating system.

As shown to best advantage in FIGS. 9 and 28, the control device 40 is preferably provided with a cover plate 250 to close the front sides of the slideways 162 and 224, so as to assist in retaining the slide valves 160 and 220 in the slideways. The cover plate 250 is disposed immediately to the rear of the carriage 80, which is slideably engaged with the cover plate. Preferably, the cover plate 250 is positioned in a recess 252 formed in the rear wall 98 of the casing 42, so that the cover plate will be flush with the rear wall. In this way, the carriage 80 is freely slideable along the rear wall 98 and the cover plate 250.

The cam follower pin 176 on the slide valve 160 preferably extends through a slot 254 in the cover plate 250. As disclosed, the cover plate 250 is provided with a plurality of rearwardly bent locating tabs 256 which are received in corresponding openings 258 in the rear wall 98. Four such tabs 256 and openings 258 are provided in the illustrated construction. The cover plate 250 may be made of thin sheet metal or some other suitable material.

I claim:

1. A fluid power control device,
comprising a casing having front and rear sides,
said casing having an opening therein extending between said front and rear sides,
an operating lever extending through said opening and movable therein,
said lever having a rear portion at the rear of said casing,
said casing having means at the rear thereof pivotally supporting said rear portion of said lever to support said lever for swinging movement in said opening and about a pivot axis,
said lever having a front manually operable portion at the front of said casing,
a fluid power slide valve member slidable in said casing in a lateral direction relative to said lever,
said laterial direction being generally parallel with said pivot axis,
said member having cam follower means thereon,
and a cam on said lever and slidably engaging said cam follower means,
said cam having a lateral throw in said lateral direction for moving said slide valve member in said lateral direction and generally parallel with said pivot axis of said lever.

2. A device according to claim 1,
in which said cam includes a cam plate element on said lever and having a lateral throw in said lateral direction,
said cam follower means including spaced follower elements slidably engaging the opposite sides of said cam plate element for reversibly following the lateral throw thereof.

3. A device according to claim 2,
in which said slide valve member is formed with a cam follower slot,
said spaced cam follower elements being formed on opposite sides of said slot.

4. A device according to claim 1,
in which said casing includes fluid port means,
said slide valve member being movable opposite said port means for selectively controlling the transmission of fluid therebetween.

5. A device according to claim 1,
including mechanical linkage operating means on said lever to the rear of said casing.

6. A combined fluid power and electrical control device, comprising
a casing having front and rear walls and a plurality of side walls,
said casing having an opening therein extending through and between said front and rear walls,
an operating lever extending through said opening and movable therealong,
said lever having a rear portion to the rear of said rear wall,
said casing having means to the rear of said rear wall and pivotally supporting said rear portion of said lever to support said lever for swinging movement in said opening,
said lever having a front manually operable portion projecting forwardly from said front wall of said casing,
said lever being swingable in a plane generally perpendicular to said front and rear walls,
said plane being generally parallel with one of said side walls,
a carriage slidable in said casing,
means in said casing and guiding said carriage for sliding movement along a path parallel with said front walland also with said one side wall,
said carriage having one particular side which is generally parallel with said one side wall of said casing,
a pin-and-slot driving connection between said lever and said one particular side of said carriage for translating the swinging movement of said lever into sliding movement of said carriage,
a slidable valve member in said casing and to the rear of said carriage,
means in said casing guiding said valve member for sliding movement along a path which is adjacent and generally parallel with said rear wall and transversely related to the path of said carriage,
a cam-and-follower driving connection between said carriage and said valve member for translating the sliding movement of said carriage into the transverse sliding movement of said valve member,
valve port means on said rear wall and cooperating with said valve member to perform fluid power control functions in response to the sliding movement of said valve member, fixed electrical contact elements in said casing and on said front wall adjacent the path of movement of said carriage, and movable electrical contactor means on said carriage and selectively engageable with said fixed electrical contact elements for performing electrical control functions in response to the sliding movement of said carriage.

7. A device according to claim 6, in which said pin-and-slot driving connection comprises a pin in said lever and slidably received in a slot formed in said one particular side of said carriage.

8. A device according to claim 6, in which said cam-and-follower driving connection comprises a cam track on said carriage and a follower on said valve member and engaging said cam track.

9. A combined fluid power and electrical control device, comprising a casing having front and rear walls and a plurality of side walls, said casing having an opening therein extending though and between said front and rear walls, an operating lever extending through said opening and movable therealong, said lever having a rear portion to the rear of said rear wall, said casing having means to the rear of said rear wall and pivotally supporting said rear portion of said lever to support said lever for swinging movement in said opening, said lever having a front manually operable portion projecting forwardly from said front wall of said casing, said lever being swingable in a plane generally perpendicular to said front and rear walls, said plane being generally parallel with one of said side walls, a carriage slidable in said casing, means in said casing and guiding said carriage for sliding movement along a path parallel with said front wall and also with said one side wall, said carriage having one particular side which is generally parallel with said one side wall of said casing, a pin-and-slot driving connection between said lever and said one particular side of said carriage for translating the swinging movement of said lever into sliding movement of said carriage, a slidable valve member in said casing and to the rear of said carriage, means in said casing guiding said valve member for sliding movement along a path which is adjacent and generally parallel with said rear wall and transversely related to the path of said carriage, a cam-and-follower driving connection between said carriage and said valve member for translating the sliding movement of said carriage into the transverse sliding movement of said valve member, valve port means on said rear wall and cooperating with said valve member to perform fluid power control functions in response to the sliding movement of said valve member, electrical contact elements in said casing and on said front wall adjacent the path of movement of said carriage, and electrical contactor means operable by said carriage and selectively engageable with said electrical contact elements for performing electrical control functions in response to the sliding movement of said carriage.

10. A device according to claim 9, in which said pin-and-slot driving connection comprises a pin in said lever and slidably received in a slot formed in said one particular side of said carriage.

11. A device according to claim 9, in which said cam-and-follower driving connection comprises a cam track on said carriage and a follower on said valve member and engaging said cam track.

* * * * *

UNITED STATES PATENT OFFICE
CERTIFICATE OF CORRECTION

Patent No. 4,126,153 Dated November 21, 1978

Inventor(s) Andrew F. Raab

It is certified that error appears in the above-identified patent and that said Letters Patent are hereby corrected as shown below:

| | | |
|---|---|---|
| Column 1, | lines 55 and 56, | "dentent porojection" should be --detent projection-- |
| Column 2, | line 38, | "conactors" should be --contactors-- |
| Column 4, | line 45, | "othe" should be --other-- |
| Column 6, | line 42, | "111a" should be --112a-- |
| Column 6, | lines 52-53, | "briding" should be --bridging-- |
| Column 8, | line 14, | "coordinate" should be --coordinated |
| Column 11, | line 24, | "though" should be --through-- |

Signed and Sealed this

*Twentieth* Day of *March 1979*

[SEAL]

*Attest:*

RUTH C. MASON
*Attesting Officer*

DONALD W. BANNER
*Commissioner of Patents and Trademarks*